166-308

CROSS REFERENCE

SEARCH ROOM

United States Patent Office 2,939,688

Patented June 7, 1960

2,939,688

OPENING FISSURES IN LOW-PERMEABILITY STRATA

Harry L. Pelzer, Catoosa, Okla., assignor to Sinclair Oil & Gas Company, Tulsa, Okla., a corporation of Maine No Drawing. Filed Oct. 5, 1955, Ser. No. 538,793

2 Claims. (Cl. 262—1)

This invention relates to a method for increasing recovery of fluids from subterranean strata. More particularly, this invention relates to increasing recovery of gas, water or crude petroleum from low permeability rock, shale, shaly sections of sand and the like penetrated by a well bore by producing a penetrating fissure system in the strata through increasing compression force of subterranean formations acting on the strata by controlled heating of the strata to cause thermal expansion thereof. The invention also contemplates the utilization of a heated gas in a well bore under pressure substantially in excess of normal well bore pressure to aid in effecting cleavage of the strata.

Because of the low permeability of certain strata, which are reservoirs for petroleum hydorcarbons, treatment of the strata to establish full communication throughout the reservoir by breaking down as many barriers to fluid flow as possible is often necessary to increase the production rates of wells penetrating the strata. For example, in shale reservoirs substantial quantities of oil are found in crevices and fractures in the shale. Although these crevices are interconnected, they are usually too small to transmit fluids in appreciable quantities. There are also those situations where good fluid communication does not exist throughout the reservoir because of the hererogeneity of deposition, or recementation. Typical of this is shaly sandstone with much lensing or a recemented dolomitic reservoir. Also a well which penetrates a reservoir which produces oil because of the porosity engendered in it by a network of fissures, joints or cracks, such as dense limestone and cemented sandstone reservoirs, may fail to produce because the well does not pierce a sufficient number of channels. Likewise, strata, whose initially high production have decreased substantially, generally require similar treatment in order to recover fluids more intimately bound to the formation.

It has been found that a penetrating fissure system can be created in low permeability strata, that is, strata having a permeability of about 10 millidarcies or less, such as low permeability strata of the type described above, and through which fissure system reservoir fluids such as oil, gas or water can be withdrawn at desirable rates, by subjecting the strata to conditions of controlled heating. Accordingly, my invention comprises a method wherein a subsurface oil-bearing low permeability stratatum from which it is desired to produce a fluid such as oil, gas or water is subjected to conditions of controlled heating to cause thermal expansion of a portion of the stratum extending for a substantial distance from the well bore. Apparently such thermal expansion of the stratum increases the compression force of subterranean formations acting on the stratum causing fissures to open in the stratum, which fissures extend radially for a substantial distance from the well bore. The deep, penetrating fissure system obtained by my method appears to be substantially permanent, and the crevices or fissures opened thereby are of sufficient magnitude to produce fluids at substantial rates. The rate of heating of the stratum is so controlled that a portion of the strata extending for a substantial distance away from the well bore, that is, a distance of at least about 3 feet, and preferably at least about 5 feet, is heated to temperatures not differing widely from the temperature of that portion of the stratum adjacent the well bore. Heating is preferably continued at a slow rate for a considerable period of time. This insures the heating of the stratum to the desired depth and substantially prevents spalling or calcination of stratum adjacent the well bore. The temperature to which the stratum is heated to cause the necessary degree of thermal expansion is found to depend upon the particular type of stratum and also upon the extent of the overburden of superincumbent strata or formations. Preferably, the stratum is heated to a temperature of at least about 1000° F. The controlled heating of the stratum is preferably obtained by means of a highly heated gas in the well bore, which gas preferably is obtained by combusting in the well bore a combustible gas, which may be any heating gas such as producer gas, water gas or natural gas, in a combustion supporting gas, which may be air, oxygen or mixtures thereof, or any permanent gas containing sufficient oxygen to effect good combustion. By controlling the rate of combustion, the stratum can be heated in the manner previously described. The temperature of the heated gas in the well bore is preferably maintained above 1000° F. It was found that the obtaining of a deep, penetrating fissure pattern in certain substantially impermeable strata, such as shale, can best be accomplished by subjecting the thermally expanded shale to pressure of a gas, such as the heating gas in the well bore. The gas pressure employed is preferably substantially greater than normal well bore pressure and preferably is at least about 1000 p.s.i. Gas pressures in the well bore can be as great as 5000 p.s.i. or greater, depending upon the nature and depth of the stratum and the type of the equipment utilized.

The process of this invention can be employed in conjunction with one or more different processes for increasing the permeability of low permeability strata. For example, after subjecting a stratum to the instant process to create a deep, penetrating fissure system, the stratum may then be subjected to a process which causes successive breakaways of the straum face in the well bore to further increase permeability. The latter process, which includes the steps of heating the stratum face to spalling temperature, e.g. above 1500° F., contacting the hot stratum surface with a small amount or "shot" of water to effect spalling, and quenching the stratum by contact with additional water to cause further cleavage, can be repeated a number of times if desired.

My process can be described in detail with respect to obtaining a deep, penetrating fissure system in Spraberry stratum, which is substantially impermeable except for small cracks or fissures which occur at intervals throughout the stratum. A casing is cemented in a well bore extending into the low permeability Spraberry stratum. A string of about two and one-half inch tubing, equipped with suitable packer means, is lowered through the casing so that the bottom of the tubing, which is preferably of stainless steel, extends for a short distance, for example about a foot, below the casing into the barefoot bore hole section at the bottom of the well. The string of two and one-half inch tubing is provided with a flapper valve of conventional design at a short distance from the lower end of the string of tubing. A string of about one and one-quarter inch tubing is lowered through a stuffing box located at the surface end of the two and one-half inch tubing and then lowered through the larger tubing until the bottom end of the one and one-quarter inch tubing is adjacent the top of the flapper valve. An ignition unit, such as a low voltage glow plug, which comprises an exposed resistance coil mounted in a suitable guide or shield and provided with suitable lead wires to the surface, and a thermocouple, which may be mounted in the glow plug guide, having suitable lead wires to the surface, are lowered through the string of one and one-quarter inch tubing to the lower end of the tubing. The upper end of the string of one and one-quarter inch tubing is then packed off with a stuffing box to permit raising and lowering of the glow plug and thermocouple.

Air is injected into the annulus between the two strings of tubing to open the flapper valve, and the string of one and one-quarter inch tubing is lowered through the open flapper valve to a point at which the lower end of the smaller string of tubing is at about the same position in the well as the lower end of the string of larger tubing. The ignition unit and thermocouple are then lowered to a point adjacent the lower end of the inner string of tubing. Approximately 50 to 200 cubic feet per hour of a combustible gas, for example a fuel gas such as natural gas, are injected through the inner string of the tubing and the injection of air through the annulus between the strings of tubing is continued. The ignition of the fuel gas is effected when an injection rate of about 50 cubic feet per hour of fuel gas and about 2000 cubic feet per hour of air is attained. The ignition unit is energized only for the short period of time required for obtianing ignition of the fuel. After ignition is effected, which is indicated by the thermocouple, operation of the ignition unit is ceased and the unit is raised to a point slightly above the lower end of the string of one and one-quarter inch tubing.

Shortly after ignition of the fuel, well bore pressure increases from normal well bore pressure of about 1200 to 1400 p.s.i. at a depth of about 3000 to 5000 feet, to about 2000 p.s.i. Combustion is continued and the rate of fuel gas and air injection is increased until an injection rate of about 300 cubic feet per hour of fuel gas and about 15,000 cubic feet of air per hour is obtained. After several hours operation, but generally within about 24 hours, during which time combustion gas temperatures greater than about 1000° F., e.g. 1500 to 1600° F., are maintained and pressures as high as 5000 p.s.i. are obtained, the pressure suddenly decreases to about normal bottom hole pressure. The rapid pressure release indicates that a deep, penetrating fissue system has been effected in the stratum.

After the pressure break is observed, fuel injection is ceased but air injection is continued to cool the stratum to normal formation temperature. The string of smaller tubing, the ignition device and thermocouple are removed from the well bore and about 300 barrels of crude oil are injected through the string of larger tubing to further cool the formation. The well is then placed on production by means of conventional pumping equipment.

The operation of the present invention as applied to a particular oil-bearing shale stratum may be more readily understood by reference to the following example. A 320 foot core hole, having a diameter of about 3 inches, was drilled into Colorado shale at a point about 50 feet distant from each of three producing wells lying in a different direction from the core hole. The core hole was cased so as to leave a 20 foot barefoot section of shale stratum, which strata had an initial permeability of about zero. The stratum was initially fractured by air and water pressure to obtain a permeability permitting a flow of 11,000 cubic feet of air per hour at 285 p.s.i. into the stratum. Utilizing equipment similar to that described heretofore, the stratum was heated for a period of about three hours by combusting a fuel gas in air in the well bore. During heating temperature of gas in the well bore was about 1200° F. and gas pressure increased to about 2100 p.s.i. At the end of the three hour period the pressure suddenly decreased permitting the injection of 35,000 cubic feet per hour of air at 25 p.s.i. into the stratum. Gas flow from the three producing wells was substantially similar indicating that a uniform fissure pattern had developed throughout the stratum. The fissure pattern did not close even when the stratum was later subjected to heat.

The thermal expansion of the startum treated by my process, in most instances, appears to result in closing the small fissures initially present in the stratum. Thus, the heating gas does not permeate the thermally expanded stratum to any significant degree, and the pressure of the gas in the well bore generally increases to pressures above normal well bore pressure. However, it is beleieved that increased force of subterranean formations acting on the thermally expanded stratum is the basic factor in obtaining the deep, penetrating fissure pattern obtained by the method of my invention.

It is claimed:

1. The method of treating low permeability subterranean stratum containing reservoir fluids and penetrated by a well bore, said stratum having a permeability less than about 10 millidarcies which comprises supplying to said well bore a combustible gas and a combustion supporting gas to burn said combustible gas in the vicinity of said stratum, to heat said stratum for a substantial distance from said bore, to maintain a temperature in said stratum of at least about 1000° F. by the controlled combustion of the combustible gas in said bore and to maintain in said bore a pressure substantially greater than normal well bore pressure and above about 1000 p.s.i. until a rapid decrease in pressure indicates that fissures extending for a substantial distance into said stratum are open.

2. The method of treating low permeability shale containing reservoir fluids and penetrated by a well bore, said shale having a permeability of less than about 10 millidarcies which comprises supplying to said well bore a combustible gas and a combustion supporting gas to burn said combustible gas in the vicinity of said shale to heat said shale for a distance of at least about three feet from said bore, to maintain a tempertaure in said shale of at least about 1000° F. by the controlled combustion of the combustible gas in said well bore and to maintain in said bore a pressure substantially greater than normal well bore pressure and above about 1000 p.s.i. until a rapid decrease in pressure indicates that fissues extending for a substantial distance into said shale are opened.

References Cited in the file of this patent

UNITED STATES PATENTS

| | | |
|---|---|---|
| 1,422,204 | Hoover et al. | July 11, 1922 |
| 2,548,463 | Blood | Apr. 10, 1951 |
| 2,630,307 | Martin | Mar. 3, 1953 |
| 2,734,579 | Elkins | Feb. 14, 1956 |
| 2,780,449 | Fisher et al. | Feb. 5, 1957 |